United States Patent [19]

Gueneau

[11] 4,408,715
[45] Oct. 11, 1983

[54] HEATING INSTALLATION FOR PREMISES FOR DWELLING OR INDUSTRIAL USE

[75] Inventor: Michel Gueneau, Aurignac, France

[73] Assignee: Societe Nationale Elf Aquitaine Tour Aquitane, Courbevoie, France

[21] Appl. No.: 244,702

[22] Filed: Mar. 17, 1981

[30] Foreign Application Priority Data

Mar. 19, 1980 [FR] France ............................ 80 06103

[51] Int. Cl.³ ........................................ G05D 23/00
[52] U.S. Cl. ............................... 237/2 B; 122/20 B; 62/238.6; 62/323.1
[58] Field of Search ............... 237/2 B, 12.1; 122/26, 122/20 B, 7 R; 126/247; 62/238.6, 323; 123/41.19, 41.2, 41.21

[56] References Cited

U.S. PATENT DOCUMENTS

| | | | |
|---|---|---|---|
| 3,984,050 | 10/1976 | Gustafsson | 62/238.6 |
| 4,027,631 | 6/1977 | Lavery | 122/7 R |
| 4,264,826 | 4/1981 | Ullmann | 126/247 |
| 4,293,092 | 10/1981 | Hatz et al. | 237/12.1 |

FOREIGN PATENT DOCUMENTS

| | | | |
|---|---|---|---|
| 1551994 | 9/1967 | Fed. Rep. of Germany | 237/12.1 |
| 2540004 | 3/1977 | Fed. Rep. of Germany | 237/12.1 |
| 2633775 | 2/1978 | Fed. Rep. of Germany | 237/12.1 |
| 2811586 | 9/1979 | Fed. Rep. of Germany | 237/12.1 |

Primary Examiner—Albert J. Makay
Assistant Examiner—Henry Bennett
Attorney, Agent, or Firm—Holman & Stern

[57] ABSTRACT

The invention relates to a heating installation for home or industrial use. It is of the type including a heat source associated with a heat pump of which the heat produced is given up to a heating fluid contained in an enclosure connected to heating members placed in the premises to be heated. It is characterized in that at least one part of the heat produced by the exhaust heat source is capable of being transferred to the heating fluid and of being added to that given up by the heat pump. The invention is particularly useful as a boiler for a heating system.

23 Claims, 3 Drawing Figures

HEATING INSTALLATION FOR PREMISES FOR DWELLING OR INDUSTRIAL USE

BACKGROUND OF THE INVENTION

1. Field of the Invention

The present invention relates to a heating installation for premises or residential or industrial use.

2. Description of the Prior Art

For a long time, attempts have been made to heat and/or cool premises for dwelling or industrial use, by using techniques achieving a performance coefficient as high as possible, in order to reduce the consumption of primary energy and more particularly petroleum products from which fuels for domestic use are extracted. More and more research is being undertaken to use new energy forms and/or to reactivate energy forms which can be applied in techniques with a high performance coefficient.

Thus, heating installations utilizing a heat pump are becoming of notably increased interest. This is because the heat pump is an apparatus capable of transferring heat which is unusable directly and taken from a low temperature source of heat, to another medium where the heat is then at a sufficient temperature to be useful under certain conditions.

Among heating installations using the heat pump, are those which are based on a water-water, ground-water, water-air or ground-air exchange. By utilizing special mixtures of cold generating fluids such as fluorinated hydrocarbons, it is possible to increase the temperatures of the heating fluid by several tens of degrees. However, this type of installation necessitates large water sources such as lakes, ground water sheets or an adequate terrain in the case of a ground-water heat pump.

To escape from the necessity for the availability of a large source of water or of a suitable terrain, a heat pump based on air-water or air-air exchange has been used.

To take advantage of the cold source constituted by the outer air and to use it at less negative temperatures, it has been proposed to reheat this air by an independent heating source to bring it to the temperature of use, namely above 0° C. This technique, attractive as it appears, does not entirely give satisfaction since it must be adapted to the external climatic conditions. Moreover, it necessitates the use of an independent heat source and hence the use of additional energy to that supplied to the heating installation. This is irrelevant for the majority of heat pumps using the outer air as a source of cold. In fact, the performance coefficient of the heat pump is all the better as the outer temperature is higher while the energy needs of the site to be heated diminish.

To avoid installations prohibitive, as to price and bulk, manufacturers propose mixed systems where the heat pump may be relayed or completed at low external temperatures by conventional supplementary heating such as a burner or an electrical resistor. The economic point of equilibrium for which the heat pump is just adapted in power to the premises to be heated is generally located between −2° C. and +6° C. For equilibrium points higher than +6° C., the annual performance coefficient is degraded by the poor performance coefficient of conventional supplementary heating. For equilibrium points below −2° C., the dimensions of the heat pump become unacceptable and approximate those of an evaporator.

Finally, it is to be noted that heat pumps using water as a hot source, are not adaptable to existing heating installations without supplementary heating. As for new heating installations, they necessitate higher investments by reason of the greater dimensions of the heating surfaces due to the fact of the technical and economic limitations relating to the temperature of the hot water.

It is an object of the present invention to overcome the foregoing drawbacks and to provide a heating installation which does not reply upon any supplementary heating, and which can operate over large temperature ranges, with a reduced bulk.

GENERAL DESCRIPTION OF THE INVENTION

According to the invention there is provided an installation of the type comprising a heat source and a heat pump of which the compressor is driven by the heat source, wherein the heat produced by the thermal dissipation and by the exhaust gases from the heat source are given up to a heating fluid circulating in heating members placed in the premises to be heated, and wherein the heat produced by the pump is also transferred to the heating fluid, characterised in that the heat source is at least in part immersed in an enclosure containing an intermediate fluid to which are transferred in totality and directly the heat produced by the thermal dissipation and in that a heat exchange is effected between the enclosure fluid and the heating fluid.

The immersion of the motor in the fluid of the boiler procures at least two advantages which reside in the fact that the supply water to the heating elements of the premises to be heated increase in temperature by the recovery of the heat dissipated by the motor while considerably attenuating the motor noise.

According to another feature, the residual heat of the exhaust gases of the motor are used to reheat the external fluid, for example air, before the latter arrives at the evaporator of the heat pump.

It is thus possible to reduce the domain of frost appearance and especially to recover the residual heat from the exhaust gases.

According to another feature, the exhaust gases before exchanging their heat with the outer air, pass into an exchanger also immersed in the fluid of the boiler which contributes to the rise in temperature of the heating fluid of the heating elements.

BRIEF DESCRIPTION OF THE DRAWINGS

The invention will be better understood on reading the detailed description which follows and on examining the accompanying drawings which show, by way of a non-limiting example, an embodiment of the invention. In these drawings.

DESCRIPTION OF PREFERRED EMBODIMENTS

Figure 1:
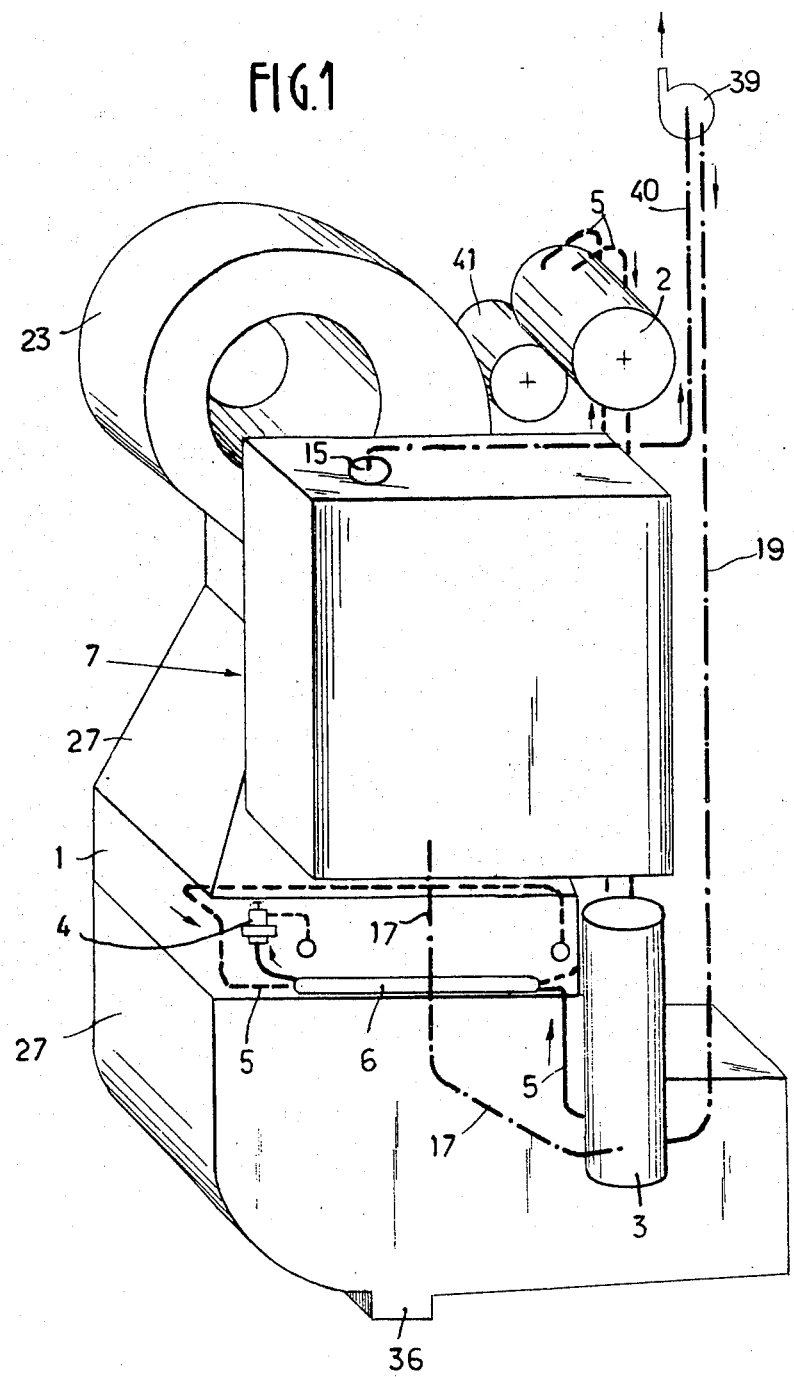
FIG. 1 is a perspective view of the principal means of the installation according to the invention.
Figure 2:
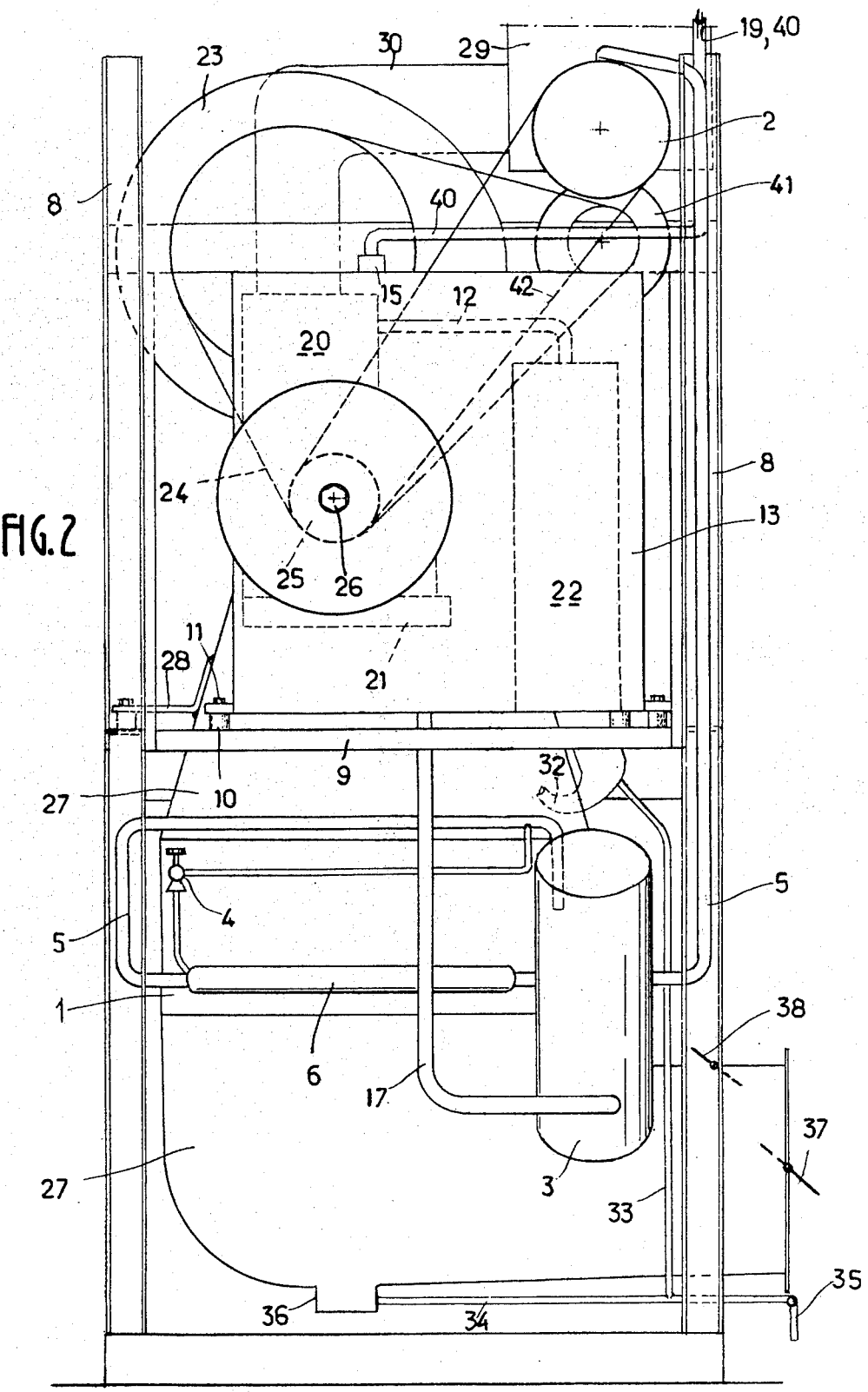
FIG. 2 is a view in a vertical section of the installation according to the invention.

Referring to FIGS. 1 and 2, the heating installation according to the invention notably comprises a heat pump constituted by an evaporator 1, a compressor 2, a condenser 3 and an expander 4, these various members being connected by a group of ducts reference 5 and in which a cooling fluid flows such as a fluorinated hydrocarbon. The whole of the heat pump structure is well known in the art and will not be described in detail. However, it will be noted that a liquid gaseous hydrocarbon suction accumulator 6 is inserted in the portion of the circuit where this conversion takes place, which permits the performance coefficient of the installation to be improved as well as the supply to the expander, while protecting the flap valves of the compressor.

A boiler 7 comprising a sound-proofed enclosure, is mounted at the upper part of an envelope 8 in which the outer body work is also sound-proofed, on a support plate 9 and immobilized on the latter and with respect to the outer envelope 8 by any suitable means such as supporting and fixing angle-irons 10 anchored by nuts and bolts 11. The boiler 7 is supplied with heating fluid, in this instance water, from the condenser 3 and through the feeder duct 17; the condenser 3 being supplied through a return duct 19 from the supply and evacuation circuit for the heating water of the premises to be heated.

A strong, reliable, perfectly fluid-tight, heat engine 20, is immersed in the water filling the boiler 7, said engine being fixed to a console 21 and supplied with energy from a source (not shown).

All the surfaces of the motor 20 are in the water with the exception of the regulator housing on which are positioned the oil filler, the air intake and fuel intake or the domestic fuel-oil injection pump, a small tunnel for the ignition plug or the injector and an outlet for a power take-off plug.

A three-way valve or a thermostatic valve 15 allows the necessary flow of water to pass to maintain constant around 80°–85° C., the temperature of the water in the boiler 7. In addition, in a fourth duct 40 there is mounted a regulator, not shown, which controls the operation of the motor 20 as a function of the starting temperature of the water outside the installation, the setting point being adjusted by repetition controlled by the ambient temperature. One consequence is to optimize the operation of the cold generating fluid circuits whose performance coefficient is improved as the hot water temperature is lower.

In the boiler 7 is mounted the gas(air)-water exchanger column 22 constituted by a corrosion-resistant column (for example stainless steel or metal coated with enamel or with fluorocarbon resins and which may be filled with metal shavings.

The column 22 is connected directly through an exchanger duct 12 to the exhaust of the motor 20 so that the exhaust gases are evacuated through said column 22 and flow in counter-current to the water coming from the condenser 3.

A blower 23 driven by the motor 20 through a belt 24 and a pulley 25 keyed on an output shaft 26 of the motor 20, draws in the air imprisoned in the envelope 8 which communicates with the outside through an envelope duct 29. The evaporator 1 of the heat pump is placed in the suction circuit of the blower. A flexible sheath 27 is held at suitable places by profiled elements or angle irons 28 fixed to the bearing and support plate 9. The air intake 30 for the engine 20 is installed on the external air inlet or on the delivery from the blower after the evaporator.

The exhaust gases, after their passage in the column 22 and at the outlet of the exhaust duct 32 connected to the column 22 are, as desired, mixed directly with the external air or directed to a tube (not shown) taking the place of an exchanger and located within the flexible sheath 27 in the part situated upstream of the evaporator in the air circuit in order that said gases may give up their heat to the external air sucked in by the blower 23. Thus, energy is recovered and used to improve the performance coefficient of the installation by reheating the external air and without resorting to another source of supplementary energy. The condensates from the exhaust gases are removed through a pipe 33 opening into a general collecting pipe 34 for the condensates forming inside the sheath and trickling along the walls of said sheaths. The collecting pipe 34 is connected to a siphon 35 for removing the condensates.

The collecting pipe 34 is fitted inclined with respect to the horizontal to enable the removal through gravity of the condensates and opens at its end opposite that connected to the siphon 35 into a collecting gutter 36 formed at the lower portion of the flexible sheath 27.

At the delivery end of the blower are mounted a shutter 37 and a recirculating shutter 38 whose function will be described in the mode of operation of the installation.

The circulation of the water is ensured by an electric pump 39 supplied by an electric outlet or by a battery if autonomous operation is desired. The blower 23 and the alternator 41 are driven directly by the belt 25, from the output shaft 26 from the engine 20. The compressor is driven from the same output shaft 26 through the belt 42.

The operation of the heating installation according to the invention is as follows:

The engine 20 being in operation, the air filling the envelope 8 is sucked in through the blower 23. This air is heated by the exhaust gases, before arriving at the evaporator 1. After a heat exchange, at the level of the evaporator 1, the heat extracting fluid circulating in the circuit 5 is aspirated in gaseous form by the compressor 2 which takes it to a high temperature and pressure, and it is then discharged into the condenser 3 where it condenses supplying heat to the heat-carrying liquid traversing the condenser 3 introduced through the pipe 19. The cooling fluid emerges in a liquid condition from the condenser, passes into the suction accumulator exchanger 6 before being adiabatically expanded through the reducing valve 4, the adiabatic expansion lowering the temperature of the cooling fluid.

At the outlet from the condenser, the water is at a temperature several degrees higher than on its entry into said condenser. This water arrives at the boiler 7 through the pipe 17.

The heat dissipated in the boiler 7 by the heat engine motor 20 and the gas-water exchanger 22 raise the temperature of the water up to about 85° C. The rise in temperature of the water due to passage through the condenser 3 and the boiler 7 is sufficient to provide, through the pump 39, water at a temperature of 85° C. to the heating elements of the premises to be heated.

Unlike heating installations of similar type, that of the present invention and described above can operate either with or without the formation of frost.

When operation without frost formation is desired, the temperature of the air or of the air-gas mixture from the exhaust at the outlet from the evaporator is always kept above 0° C. by reducing the volume of air sucked in by the blower 23 and by recirculating a portion of the air or of the air-gas mixture through the outlet of the blower. To do this, the shutters 37 and 38, fitted at the delivery from the blower 23 in the sheath 27, are brought into their suitably balanced positioned, for example, by means of a small two-way electric motor (not shown) and a double contact thermostat (not shown) corresponding to the two directions of rotation of the small motor.

For an ambient air temperature below 0° C., at the outlet from the evaporator, the air intake is interrupted by closing the shutter 37. The amount of heat supplied by the exhaust gases is then less than the cooling power of the compressor. Under these conditions, the engine 20 is no longer sufficiently loaded and the heat that it dissipates thermally is not sufficient to ensure a sufficient flow of hot water. There is therefore provided a capacity regulator (not shown), controlled by the intake pressure of the compressor, which will send warm hydrocarbon directly into the evaporator without passing through the condenser and the pressure reducer. The capacity regulator will be adjusted so that the recycled exhaust gases which are saturated with water do not form frost in the evaporator, and there will be provision for placing said regulator out of circuit when external air is sucked in.

The closing of the shutter 37 and the full opening of the recirculating shutter 38 is controlled by a thermostat (not shown).

Operation of the installation with the formation of frost involves an intake of the external air at all temperatures. When frost formation is detected, the air intake is eliminated by closing the shutter 37, and the recirculating shutter 38 is opened to permit recirculation of the air or of the air-gas mixture. Under these conditions, the frost possibly formed is directly or indirectly subjected to the action of the exhaust gases which emerge at around 100° C. from the exchanger 22. The frost hence melts fairly rapidly and the operation is stopped by a reverse manipulation of the shutters by means of a thermostat (not shown) placed at the outlet from the evaporator, since the temperature is above a predetermined value higher than 0° C. During the whole defrosting operation, the compressor is disengaged and a suitable opposing torque is maintained on the engine in order to obtain the maximum heat in the exhaust gases by increasing the speed to the maximum and by profiting from the fact that the blower absorbs, at maximum speed, a high power in the recirculating position. Advantage can also be taken of this period for recharging the battery.

Formation of frost can be detected by a differential air pressure sensor between the upstream and downstream section of the evaporator or by any other suitable means.

Tests and calculations have shown that by means of the introduction of heat from the exhaust gases at the level of the evaporator, the field of use of the boiler is reduced by about 4° C. without frost formation on the evaporator in contrast to conventional installations comprising utilizing the same evaporator and the same blower. This advantage is important since frost is formed to a considerable extent in the most usual temperature zones between −2° C. and +6° C.

For low temperatures, below +6° C., the performance coefficient and the bulk of the heat pump become prohibitive and this is the reason why additional heating is incorporated in prior art installations. By contrast, in the installation according to the present invention, the heat engine will continue to supply heat because the compressor 2 and the condenser 3, although supplying hardly any heat, constitute the principal opposing load or opposing torque indespensable in order that the heat engine may supply directly the major portion of the heat necessary for the heating of the water. To this end, the heat engine is oversized with respect to the power P which the engine would have if it were calculated by a heat pump only operating below an ambient temperature of limit comprised between −2° C. and +6° C. This oversizing leads to the adoption of a power supplied to the heat engine of about 1.2 to 5 times said power P. Tests have shown that an installation according to the invention, having a power of 17.4 kwh driven by a 3.1 kwh motor and calculated for an outside temperature of 10° C. would have its power brought back to 11.3 kwh with a motor of 1.8 kwh if it were calculated for an outside temperature of 0° C.

Another feature of the invention is that the heating installation comprises a regulator whose purpose is to adapt the power of the boiler permanently to the actual needs of the premises to be heated. This regulation permits, besides a better performance coefficient of the heat pump, a reduction in the frequency of restarting, increasing the lifespan of certain members such as the motor and the starter which is associated with it.

Without going into the details of formulae wellknown to technicians, which give the relationship between the measured ambient temperature of the premises to be heated, the outside temperature and the temperature of the water at the outlet of the boiler, the present invention provides means for self-regulating the operation of the above-described installation and for producing thus a thermal equilibrium of the premises to be heated respecting the set ambient temperature, whatever the heating demands of the premises to be heated.

In fact, for reasons of sound operation of the heat engine 20, the latter does not rotate at a speed below 2000 rpm. This involves two types of operation of the installation according to the invention, as defined by a heating demand above or below the power supplied by said installation at 2000 rpm.

Figure 3:
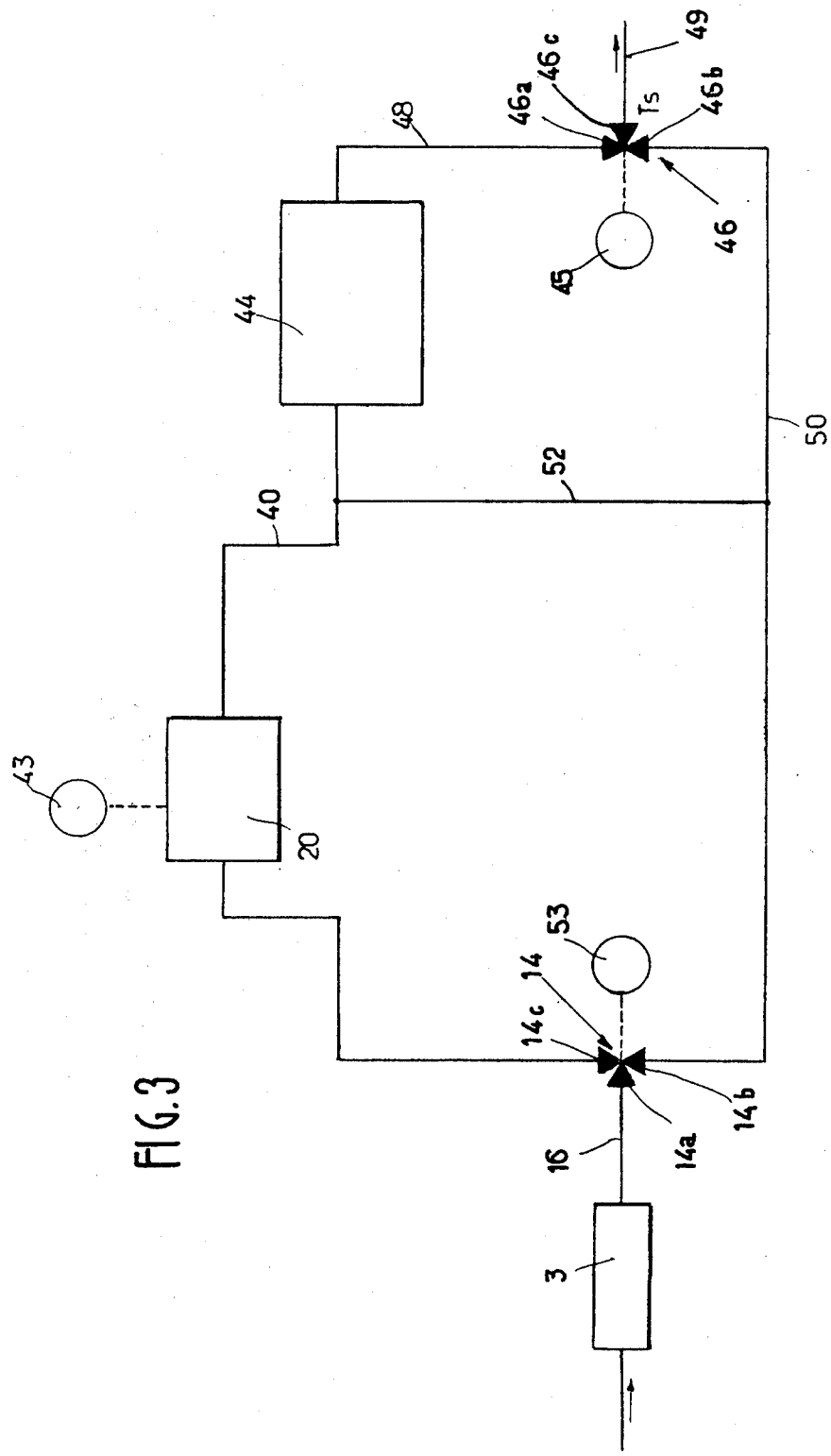
FIG. 3 is a schematic diagram of the regulating system.

To this end, the installation comprises (FIG. 3) a servomotor 43 with a double direction of rotation whose rotary speed is very low, for example of the order of 0.5 rph and which acts on the speed regulator of the heat engine 20. The servomotor 43 is electronically controlled in all or nothing mode, in both directions of rotation by the difference $\epsilon$ between a set temperature and the outlet 13 of the boiler (for example 80° C.) and the actual outlet temperature. When $\epsilon > dT$, dT being equal for example to 1° C., the speed setting of the engine is increased, while when $\epsilon > -dT$, the speed setting of the engine is decreased.

This action on the speed of the heat engine 20 is reflected very rapidly in the outlet temperature of the water from the boiler, which permits a regulated and perfectly stable heating installation to be achieved. This is due to the fact that the heat absorption in the water from the boiler varies in the same sense as the rotary speed of the engine.

The set temperature, at the outlet of the boiler, is calculated periodically by suitable means, for example every 5 min, as a function of the heat demands of the premises to be heated. This enables working with a water temperature as low as possible in order to have a maximum performance coefficient.

To permit the regulation of the installation (FIG. 3), a three-way valve 14, controlled by a servomotor 53 and with an inlet 14a is connected to the outlet from the condenser 3 through a duct 16 whilst one of the outlets 14c is connected to the boiler 7 through a duct 18 and the other outlet 14b is connected to a fifth duct 50. The outlet from the boiler 7 is connected to a reserve tank 44 through a fourth duct 40 of which a duct branch 52 is connected to the fifth duct 50.

The second servomotor 53 is controlled by the temperature of the water of the boiler.

A second three-way valve 46 controlled by a third servomotor 45 is connected through an inlet 46b to the duct 50 through another inlet 46a to an evacuation duct 48 from the tank 44 and through an outlet 46c to a supply pipe 49 of the heating elements (not shown) of the premises to be heated.

The reserve tank 44, filled with water at a temperature close to the set temperature (80° C.) permits on the one hand storage of the surplus power of the boiler and hence the duration of an operating period of the engine 20 to be increased and, on the other hand, an increase in the duration of the rest period of the engine 20 by restoring to the heating circuit water at 80° C. contained in the tank 44.

To maintain the temperature level of the water of the boiler outlet at the set temperature, the restoration flow rate from water in reserve in the tank 44 is regulated by means of the third servomotor 45 which controls the second three-way valve 46 regulating the flow rate of the water circulating in the fifth duct 50 and the flow rate of the water coming from the reserve tank 44 and circulating in the evacuation duct 48.

When the heat demand of the premises to be heated is higher than the heating power supplied for a rotary speed of the engine 20 at 2000 rpm, the motor 20 rotates constantly and the water coming from the condenser 3 circulates through the boiler 7 and the duct branch 52, fifth duct 50 and supply pipe 49, the inlet 46a being closed, while the outlets 14b and 14c and the inlet 46b are open. The temperature of the water delivered into the fourth duct 40 is maintained at the set temperature (80° C.). The temperature of the water in the pipe 49 regulates the rotary speed of the motor 20 under the control of the servomotor 43 as described above, as a function of the measured difference ϵ.

When the heating demands of the premises to be heated are less than the heating power supplied for a rotary speed of the motor 20 equal to 2000 rpm, two modes of operation may be ensured: motor at 2000 rpm or motor stopped; and this is accomplished, by means of a control, not shown, which is regulated for the speed of 2000 rpm of the motor 20.

When the command is triggered, the motor 20 is stopped. The second servomotor 53 closes the outlet 14c of the valve 14. The water coming from the duct 16 circulates through 14a. 14b, 50, and 52. If the outlet temperature in the pipe 49 decreases too much, the third servomotor 45 actuates the progressive closing of the inlet 46b and the progressive opening of the inlet 46a of the second valve 46 enabling the tank 44 to be emptied of hot water into the pipe 49 and to be filled with return water through the duct branch 52. The temperature of the outlet water in the pipe 49 is no longer controlled and because of this drops rapidly. This fall in temperature is detected and results in the starting of the motor 20 until it reaches the speed of 2000 rpm. During this time, the reserve tank 44 fills with water whose temperature increases to reach the setting temperature of 80° C. To do this, the channels 14b and 46a are closed and channels 14c and 46b are opened.

In this way cycles are created in the course of which a stopping of the motor 20 with the emptying of the reserve tank 44, is followed by a starting of the motor 20 with reheating of the water contained in the tank 44 and this as a function of the outlet temperature of the water in the pipe 49.

The various electronic control circuits of the servomotors 43 and 45 as well as the connecting circuits have been neither illustrated nor described in detail since they are well known to specialists in the art.

For periods when the ambient temperature is comprised between −2° C. and +6° C. approximately, the motor 20 will operate, if necessary at all, in "little" mode corresponding to idling of the motor, the compressor being declutched and the flaps in recirculation position. This idling has the advantage of reducing the number of starts to periods when they are most frequent and to permit the defrosting operation even in the absence of frost during these idling periods.

Of course, the present invention is not limited to the embodiment described above but also includes all modifications thereof. Thus, the control of the closing of the flap-valve (shutter) 37 may be effected from the dewpoint given by a hygrometer and a dry thermometer.

In addition, as already indicated, the installation can operate with the use of domestic fuel (gas or oil). In this case, taking into account the fact that the exhaust gases from a diesel engine supplied with domestic fuel are corrosive, there will be provided either, as already indicated, an exchanger protected from corrosion enabling the transfer to the air of the residual heat and exhaust gases, or an evaporator and ducts coated with corrosion resistant plastic material.

We claim:

1. A heating installation for home or industrial use, comprising:

a boiler enclosure containing an intermediate liquid to be heated;

an internal combustion engine suspended in said boiler and at least partially submerged in said intermediate liquid for operating in said submerged condition so that heat generated by the operation of said engine is transferred directly to said intermediate liquid;

an exhaust pipe means for removing exhaust gases connected to said internal combustion engine and at least partially submerged in said intermediate liquid;

an exhaust heat exchanger located within the boiler enclosure and operatively connected to said exhaust pipe, so that heat from the submerged portions of the exhaust is transferred to the intermediate liquid;

a heat pump having a condenser, an evaporator, and a compressor which is driven by said internal combustion engine, said compressor being the only load of said internal combustion engine, so that at lower temperatures the amount of required compression and resulting load increases, producing therefore a greater thermal dissipation from said internal combustion engine, while heat from said condenser is transferred to said intermediate liquid within the condenser;

heating members located in the premises to be heated and supplied with a heating fluid heated by the intermediate liquid of said boiler; and said condenser being situated downstream from the heating members and upstream from the boiler so that the heating fluid flowing from said heating members to said boiler is heated during its passage through the condenser.

2. The installation of claim 1 wherein heat is transferred from the intermediate liquid to the heating fluid by an exhaust heat exchanger.

3. The installation of claim 1 wherein the heating fluid is the intermediate liquid.

4. The installation of claim 1 further comprising means for reducing the apparent power of the boiler constituted by the enclosure containing the heating fluid, said means comprising on the one hand a heating fluid reserve tank brought to a predetermined high temperature when the engine is in operation, and on the other hand members adapted to transfer from the reserve tank said heating fluid into heating members when said engine is stopped, and wherein means are also provided to reengage said engine when the reserve tank is emptied of all or part of its heating fluid at high temperature.

5. The installation of claim 1 wherein a fluid is associated with the evaporator of the heat pump in a heat exchange relationship, said fluid consisting essentially of ambient air circulated by a blower, and wherein a delivery duct is mounted on the blower, said evaporator being inserted between the inlet and the outlet of said duct.

6. The installation of claim 5 further comprising an envelope connected to the external ambient medium and constituting an air duct for the blower and in which are housed all the essential constituent members of said installation.

7. The installation of claim 6 wherein the envelope and the enclosure are sound-proofed and heat insulated.

8. The installation of claim 1 wherein an outlet for the exhaust heat exchanger is connected by a conduit to a general evacuation conduit for condensate deposited at the base of the envelope.

9. The installation of claim 8 wherein the general evacuation conduit for condensation is inclined to the horizontal and opens at one of its ends into a trough formed at the base of the delivery duct, said trough extending transversely with respect to the direction of the general evacuation duct whose other end is connected to a siphon.

10. The installation of claim 4 wherein the removal of water from the boiler is effected by means of thermostatic valves.

11. The installation of claim 1 wherein circulation of the intermediate liquid in the exchanger is counter-current to the exhaust gases.

12. The installation of claim 1 wherein the temperature of the intermediate liquid around the engine is constant.

13. The installation of claim 1 wherein the exhaust exchanger is a cylinder filled with metal shavings.

14. The installation of claim 6 wherein an air regulating shutter is mounted in a delivery duct between the inside of the envelope and the external ambient medium.

15. The installation of claim 5 wherein a shutter for recycling air or air exhaust-gas mixture is mounted in the delivery duct.

16. The installation of claim 1 wherein frost which is possibly formed on the evaporator is removed by means of the exhaust gas.

17. The installation of claim 5 wherein the blower consumes the major portion of the power of the engine for the removal of frost which is possibly formed on the evaporator.

18. The installation of claim 17 wherein the defrosting function is operable during the period of idling of the engine.

19. The installation of claim 1 wherein the power of the engine for low temperatures is between 1 and 5 times the power necessary for the operation of the heat pump at 0° C.

20. The installation of claim 4 wherein a first three-way valve is inserted between (a) the outlet of the condenser of the heat pump, (b) the enclosure containing the heating fluid and (c) a duct connected to one passage of a second three-way valve of which the two other passages are connected (a) to a duct for supplying the heating members and (b) to the reserve tank which is connected to said enclosure and through a branch duct to the duct linking the two valves, the engine and the valves being actuated by at least two servomotors themselves actuated by the difference in temperature of the fluid circulating in the heating members and a predetermined value.

21. The installation of claim 1 wherein a major portion of the internal combustion engine is submerged in the intermediate liquid.

22. The installation of claim 1 wherein the intermediate liquid is water.

23. The installation of claim 1 wherein both the intermediate liquid and the heating fluid are water.

* * * * *

UNITED STATES PATENT AND TRADEMARK OFFICE
CERTIFICATE OF CORRECTION

PATENT NO. : 4,408,715
DATED : October 11, 1983
INVENTOR(S) : Michel Gueneau

It is certified that error appears in the above–identified patent and that said Letters Patent are hereby corrected as shown below:

[73] Assignee:"Societe Nationale Elf Aquitaine Tour Aquitane, Courbevoie, France" should be --Societe Nationale Elf Aquitaine (Production) Courbevoie, France--

Signed and Sealed this

Eleventh Day of September 1984

[SEAL]

Attest:

Attesting Officer

GERALD J. MOSSINGHOFF

Commissioner of Patents and Trademarks